US006873884B2

(12) United States Patent
Brackett et al.

(10) Patent No.: US 6,873,884 B2
(45) Date of Patent: Mar. 29, 2005

(54) COMPUTER-EQUIPPED MOBILITY DEVICE AND METHOD OF CONNECTING TO A NETWORK

(75) Inventors: C. Cameron Brackett, Naperville, IL (US); Steven L. Fors, Chicago, IL (US); Mark M. Morita, Arlington Heights, IL (US)

(73) Assignee: GE Medical Systems Information Technology, Milwaukee, MI (US)

( * ) Notice: Subject to any disclaimer, the term of this patent is extended or adjusted under 35 U.S.C. 154(b) by 154 days.

(21) Appl. No.: 10/304,533

(22) Filed: Nov. 26, 2002

(65) Prior Publication Data

US 2004/0100082 A1 May 27, 2004

(51) Int. Cl.⁷ ............................................... G06F 7/00
(52) U.S. Cl. .............................. 701/1; 701/24; 701/33; 701/36; 340/425.5; 340/426.16; 340/426.2; 340/459; 340/500; 340/539.11; 340/539.12; 340/286.07; 455/403; 455/899; 379/90.01; 379/265.02
(58) Field of Search ............................. 701/1, 24, 33, 701/36; 340/425.5, 426.16, 426.2, 459, 500, 539.11, 539.12, 286.07; 455/403, 899; 379/90.01, 265.02

(56) References Cited

U.S. PATENT DOCUMENTS

| | | | | |
|---|---|---|---|---|
| 6,282,464 | B1 * | 8/2001 | Obradovich | 701/1 |
| 6,526,335 | B1 * | 2/2003 | Treyz et al. | 701/1 |
| 2002/0049079 | A1 * | 4/2002 | Buckley et al. | 455/568 |
| 2003/0065432 | A1 * | 4/2003 | Shuman et al. | 701/48 |
| 2003/0224839 | A1 * | 12/2003 | Takahashi et al. | 455/575.2 |
| 2004/0024502 | A1 * | 2/2004 | Squires et al | 701/33 |
| 2004/0081309 | A1 * | 4/2004 | Bickford et al. | 379/265.02 |

OTHER PUBLICATIONS

Dell—Dell Notebooks, "Choose a Notebook Line", available at http://www.dell.com/us/en/gen/products/line_notebooks.htm (available at least as of Nov. 28, 2002).

Dell—Which Dell Notebook is Right for you?, available at http://www.dell.com/us/en/gen/topics/sbtopic_001_learningnb-whichnb.htm (available at least as of Nov. 28, 2002).

Amazon.com, "Segway Human Transporter", available at http://www.amazon.com/exec/obidos/tg/detail/-/B00007EPJ6/ref=dp_seg_cent_3/103-8514163-4131062?v=glance&s=electronics&vi=pictures (available at least as of Nov. 28, 2002).

Amazon.com: Electronics, "Segway Human Transporter," available at http:/www.amazon.com/exec/obidos/tg/detail/-/B00007EPJ6/103-8514163-4131062?vi=glance (available at least as of Nov. 28, 2002).

Segway, Segway HT, "Maximize your abilities. Minimize your presence.", available at http://www.segway.com/segway/ (available at least as of Nov. 28, 2002).

Fujitsu PC Corporation—Tablet PCs, "ST4000 Tablet PC," available at http://www.fujitsupc.com/www/products_pentablets.shtml?products/pentablets/st4000a (available at least as of Nov. 28, 2002).

Gateway Computers—Gateway Tablet PCb, available at Http://www.gateway.com/work/prod/sb_tabletpcb_ProdDetail.shtml (available at least as of Nov. 28, 2002).

(Continued)

*Primary Examiner*—William A. Cuchlinski, Jr.
*Assistant Examiner*—Olga Hernandez
(74) *Attorney, Agent, or Firm*—Andrus, Sceales, Starke & Sawall, LLP

(57) ABSTRACT

A computer-equipped mobility device for transporting an occupant of the device over a distance and for providing access to a network comprises a personal mobility device, a computer, and an activation member. The computer is coupled to the personal mobility device and is configured to link to the network as well as to engage in two-way communication with the network. The activation member is coupled to the personal mobility device. The activation member is also linked to the computer and capable of at least partially controlling the operation of the computer.

24 Claims, 4 Drawing Sheets

OTHER PUBLICATIONS

Gateway Accessory Store, "Cordless Optical Mouse," available at http://accessories.gateway.com/AccessoryStore/Hardware__316441/Input+Devices__316608/Mice__316612/1828439_ProdDetail.htm (available at least as of Nov. 28, 2002).

Gateway Accessory Store, "Web Pro Optical Mouse", available at http://accessories.gateway.com/AccessoryStore/Hardware__316441/Input+Devices__316608/Mice__316612/1830069_ProdDetail.htm (available at least as of Nov. 28, 2002).

Palm Products—Tungsten W Handheld, available at http://www.palm.com/products/handhelds/tungsten-w/ (available at least as of Nov. 28, 2002).

Palm Products: Palm m515 Handheld, available at http://www.palm.com/products/palmm515/ (available at least as of Nov. 28, 2002).

Palm Products—Handhelds, "The Palm Handheld Family," available at http://www.palm.com/products/handhelds/ (available at least as of Nov. 28, 2002).

* cited by examiner

FIG. 1
FIG. 2
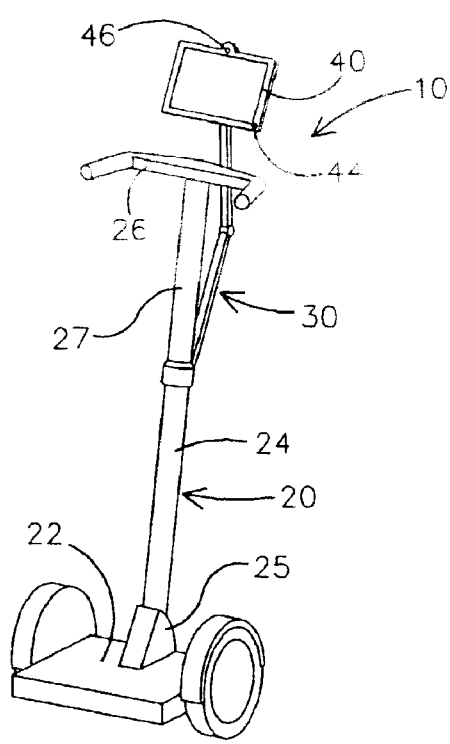
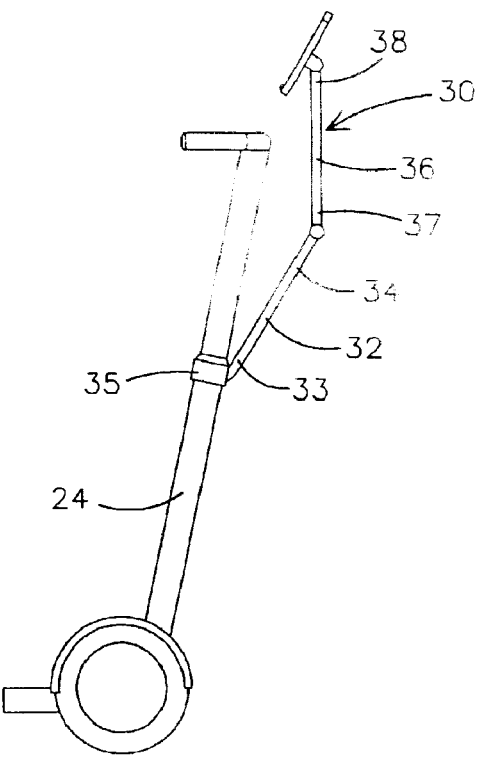
FIG. 3
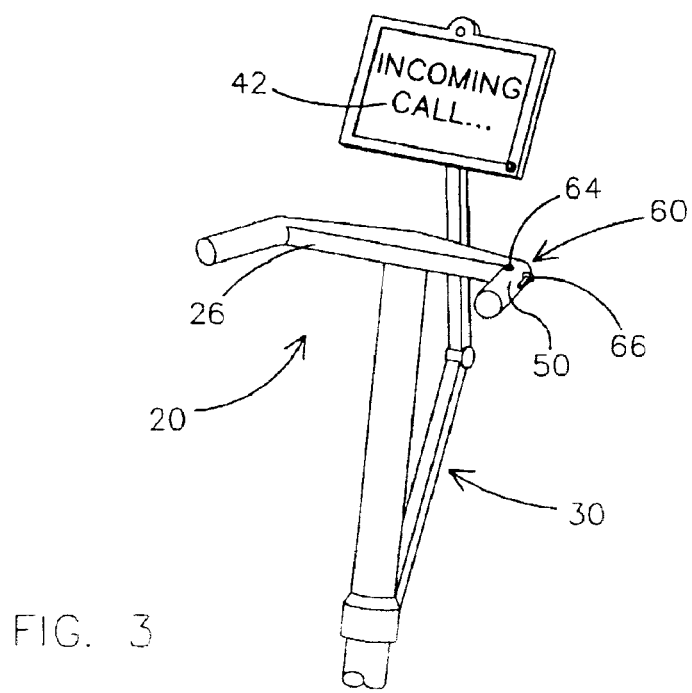

COMPUTER-EQUIPPED MOBILITY DEVICE AND METHOD OF CONNECTING TO A NETWORK

FIELD OF THE INVENTION

The present invention relates generally to computer-equipped mobility devices. More specifically, the present invention relates to computer-equipped mobility devices that provide access to a network while the computer-equipped mobility device is in use.

BACKGROUND OF THE INVENTION

Hospital campuses are growing and expanding to accommodate the demand for quality patient care. As a result, it is becoming very common for healthcare professionals to travel considerable distances to get from their office in one building to hospital rooms in another, or to yet another building for clinical consultations. Such traveling from place to place can take a significant amount of time. While the use of existing personal mobility devices helps to reduce the time required to move between two places, it does not completely eliminate it. Thus, even with existing personal mobility devices, the amount of travel time can still account for a significant portion of a doctor's day.

This increase in the amount of time doctors must spend traveling between different locations means doctors have less time to review the information they need to treat their patients and less time to address the calls, pages, e-mails, faxes, etc. they are bombarded with each day. Moreover, as the amount of time a doctor spends traveling each day increases, it becomes increasingly more likely that doctors will be called upon to address urgent situations while they are traveling. But in order to adequately address these situations, doctors may sometimes need to review vital patient information. However, doctors generally are unable to acquire such information while they are traveling. Currently, the best way for a doctor to access the patient information needed to address a certain matter is either to find an unoccupied workstation in the hospital enterprise or to travel back to the office. Both of these options increase the total amount of travel time, and neither of them allow a doctor to respond in a timely fashion. Accordingly, there is a need for a personal mobility device that allows doctors (as well as other people in similar situations) to make efficient use of the increasing amount of time they are traveling. There is also a need for a personal mobility device that allows doctors to quickly access clinical information while traveling between different locations.

Generally, a person's arms and hands must be used to operate a personal mobility device. For example, the use of a person's hands and arms may be required to steer the personal mobility device and possibly to control the throttle. Thus, the ability to utilize the driver's hands and arms for other purposes, such as accessing patient information or receiving phone calls from a cellular phone, is limited. While the driver's hands can be freed up by pulling over and stopping the personal mobility device, doing so only increases the time it takes to get to the desired location. Accordingly, there is a further need for a personal mobility device that allows a doctor to receive phone calls and to access needed information without substantially interfering with the doctor's ability to operate the personal mobility device.

SUMMARY OF THE INVENTION

In an exemplary embodiment of the invention, a computer-equipped mobility device for transporting an occupant of the device over a distance and for providing access to a network comprises a personal mobility device, a computer, and an activation member. The computer is coupled to the personal mobility device and is configured to link to the network as well as to engage in two-way communication with the network. The activation member is coupled to the personal mobility device. The activation member is also linked to the computer and capable of at least partially controlling the operation of the computer.

In another exemplary embodiment of the invention, a computer-equipped mobility device for transporting an occupant of the device over a distance and for providing access to a network within a network accessible area comprises a personal mobility device, a computer, and an activation member. The personal mobility device is configured to accommodate a single occupant. The computer is coupled to the personal mobility device. The computer also is configured to link to the network through wireless communication when the computer-equipped mobility device is within the network accessible area. The activation member is coupled to the personal mobility device. The activation member is further linked to the computer and allows the occupant to at least partially control the operation of the computer while the occupant is operating the personal mobility device.

In yet another exemplary embodiment, a conversion kit for converting a personal mobility device into a computer-equipped mobility device comprises a computer, a support member, and an activation device. The computer is configured to link to a network. The support member is coupled to the computer and is for coupling to the personal mobility device. The activation member is linked to the computer and is capable of at least partially controlling the operation of the computer.

In another exemplary embodiment, a method of receiving a phone call while operating a computer-equipped mobility device comprises establishing a link between a computer included in the computer-equipped mobility device and a network. The computer receives an incoming call while linked to the network and indicates the presence of the incoming call to an occupant of the computer-equipped mobility device. The computer answers the call after the occupant of the computer-equipped mobility device activates for a first time an activation member that is linked to the computer. After the activation member is activated for the first time, the computer establishes a link between the computer and at least one of a headset worn by the occupant of the computer-equipped mobility device and a speaker and microphone included in the computer. The computer provides a medium for two-way communication between the caller and the occupant. The computer terminates the call after the activation member is activated a second time. It then terminates the link between the computer and the at least one of the headset worn by the occupant of the computer-equipped mobility device and the speaker and microphone included in the computer. The computer transfers the call to the occupant's voice mail after one of a plurality a time intervals elapses before the activation member is activated the first time.

In another exemplary embodiment of the invention, a computer-equipped mobility device for transporting an occupant of the device over a distance and for providing access to a hospital information system within a system accessible area comprises a personal mobility device, a first support member, a computer, a second support member, and an activation member. The personal mobility device is configured to accommodate a single occupant and comprises at least two wheels, a platform disposed between the at least two wheels, a column extending from the platform and having a first end coupled to the platform, and handlebars coupled to a second end of the column. The first support member is coupled to the personal mobility device, and the computer is detachably coupled to the first support member. The computer is configured to link to the hospital information system through wireless communication and to provide at least one of patient charts, patient status information, and patient monitoring information when the computer-equipped mobility device is within the system accessible area. The computer is one of a tablet PC, a PDA, a laptop, and a pocket PC. The second support member is coupled to the personal mobility device, and the activation member is coupled to the second support member. The activation member is linked to the computer and allows the occupant to at least partially control the operation of the computer while the occupant is operating the personal mobility device.

In still another exemplary embodiment of the invention, a computer-equipped mobility device for connecting to a network comprises a means for transporting an occupant over a distance, a means for linking to the network and for engaging in two-way communication with the network, and a means for answering and terminating calls received by the linking means. The linking means is operable while the occupant is operating the transporting means. The linking means is also configured to receive calls.

BRIEF DESCRIPTION OF THE DRAWINGS

FIG. 1 is a rear perspective view of a computer-equipped mobility device according to one embodiment of the present invention.

FIG. 2 is a side elevational view of the computer-equipped mobility device of FIG. 1.

FIG. 3 is a partial rear perspective view of a computer-equipped mobility device according to another embodiment of the present invention.

DETAILED DESCRIPTION OF THE PREFERRED EMBODIMENTS

Figure 4:
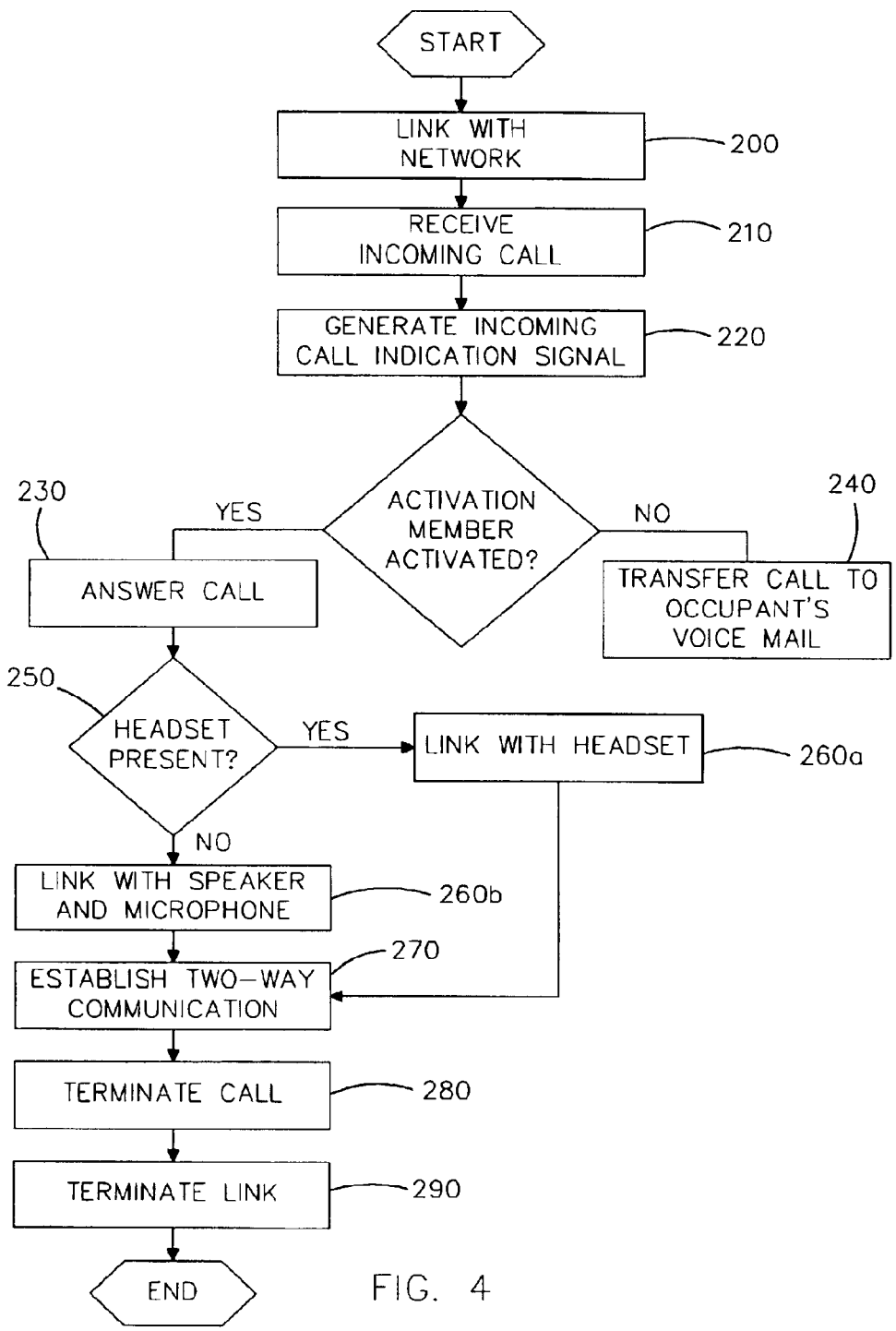
FIG. 4 is a process used in connection with one embodiment of the present invention.

Referring to FIGS. 1 and 3, computer-equipped mobility device 10 may include a personal mobility device 20, a computer support member 30, a computer 40, a user input device support member 50, and a user input device 60.

Referring now to FIG. 1, personal mobility device 20 may be one of a variety of personal modes of transportation. For example, personal mobility device 20 may be a SEGWAY™ human transporter (trademark owned by Segway LLC), a scooter, a bicycle, a moped, or other similar device designed to transport one or two passengers over relatively short distances. Depending on its design, personal mobility device 20 generally includes a platform 22, a column 24, and handlebars 26, each of which is conventionally known within the art and may take a variety of shapes and configurations. Platform 22 is a rigid-surface that supports the weight of an occupant 15 (shown in FIG. 5) and may be designed such that an occupant 15 may sit or stand on it.

Platform 22 may be made from a variety of different materials and take a variety of different shapes. Column 24 is a generally vertical member that includes a first end 25 and a second end 27. First end 25 is coupled to platform 22 such that column 24 extends upwardly from platform 22, placing second end 27 distal platform 22. Column 24 can take a variety of different shapes and be made from a variety of different materials, as long as the shape and materials allow column 24 to provide sufficient support for handlebars 26. Handlebars 26 extend generally horizontally from second end 27 of column 24. Handlebars 26 may be designed to provide a stable structure that occupant 15 may use to maintain balance while on personal mobility device 20, and/or may be designed to allow occupant 15 to steer personal mobility device 20. Additionally, various displays and mechanisms (not shown) may be coupled to handlebars 26 to control and monitor the function of personal mobility device 20.

Referring now to FIG. 2, computer support member 30 (e.g., bracket, support, connector, coupler, arm, brace, etc.) couples computer 40 to personal mobility device 20 of computer-equipped mobility device 10. Support member 30 includes a column arm 32 and a computer arm 36, and may be made from one or more of a variety of different materials, including metal alloys and polymers. Column arm 32 couples at a first end 33 to column 24 and at a second end 34 to computer arm 36. First end 33 may couple to column 24 in a wide variety of conventionally known ways. For example, first end 33 may include a circular clamp 35 that grips the circumference of column 24, or column arm 32 and personal mobility device 20 may include mating fasteners. Alternatively, first end 33 of column arm 32 may be bolted onto personal mobility device 20 or otherwise coupled to personal mobility device 20 through the use of one of a variety of couplers, fasteners, and/or connectors. Additionally, column arm 32 may be pivotally coupled to column 24, or alternatively, may be rigidly coupled to column 24. Second end 34 of column arm 32 is pivotally coupled to a first end 37 of computer arm 36 to allow computer arm 36 to pivot with respect to column arm 32. The various methods of providing for such pivoting are conventionally known within the art. A second end 38 of computer arm 36 is preferably pivotally and releasably coupled to computer 40 to allow computer 40 to pivot with respect to computer arm 36 and to be released from support member 30 if desired. A variety of methods and structures that are conventionally known within the art may be used to provide the various connections described above.

Support member 30 allows occupant 15 to adjust the position of computer 40, which gives occupant 15 the ability to position computer 40 in a location that is most comfortable to occupant 15. The ability to adjust the position of computer 40 also helps to ensure that computer 40 can be placed in a position that enhances the ability of occupant 15 to operate computer-equipped mobility device 10. In alternative embodiments, computer 40 may be coupled to personal mobility device 20 through the use of a wide variety of other coupling mechanisms. For example, computer 40 may be coupled to personal mobility device 20 by a bracket having only one arm, or it may be rigidly coupled to personal mobility device 20 such that computer 40 would not be moveable with respect to personal mobility device 20. Through the use of different coupling arrangements (which are conventionally known within the art) computer 40 may be given various degrees of adjustability.

Computer 40, shown as a tablet PC, is one of a variety of computers that are commercially available in the marketplace. For example, computer 40 may be one of a variety of personal computers, including but not limited to a laptop computer, a tablet PC, a personal digital assistant (conventionally known as a PDA), a pocket PC, or some other version of a relatively small-sized computer. Generally, computer 40 has its own power source, but in alternative embodiments, computer 40 may utilize the power source of personal mobility device 10, if personal mobility device 10 includes its own source of power.

Referring to FIG. 3, computer-equipped mobility device 10 may also include a user input device support member 50 (e.g., bracket, support, connector, coupler, arm, brace, etc.) for coupling user input device 60 to personal mobility device 20 of computer-equipped mobility device 10. Support member 50, which may be one of a variety of coupling devices conventionally known within the art, may take a variety of different shapes and configurations. It may also be made from one or more of a variety of different materials, including but not limited to metal alloys and/or polymers. These aspects of support member 50 may vary depending on the configuration of the user input device 60. Support member 50 serves to couple user input device 60 to personal mobility device 20 in such a way, and in such a location, that occupant 15 of computer-equipped mobility device 10 can use user input device 60 at the same time occupant 15 is operating personal mobility device 20. Thus, support member 50 preferably is configured to couple user input device 60 to personal mobility device 20 in a location close to where the hands of occupant 15 will be placed when occupant 15 is operating computer-equipped mobility device 10. If personal mobility device 20 includes handlebars 26, support member 50 normally couples user input device 60 to handlebars 26. In an alternative embodiment, computer-equipped mobility device 10 may not include support member 50. Rather, personal mobility device 20 may be specifically designed to incorporate or to receive a particular user input device 60. In yet other alternative embodiments, computer-equipped mobility device 10 may not include user input device 10, and therefore, would not require support member 50.

User input device 60 is coupled to support member 50 (or alternatively, to personal mobility device 20) and allows occupant 15 to at least partially, if not completely, control the operation of computer 40. In a preferred embodiment, user input device 60 may include a direction control member 64 and an activation member 66 that, together, mimic the operation of a conventional mouse. Direction control member 64 and activation member 66 are located on personal mobility device 20 such that the thumb of occupant 15 may be used to operate direction control member 64 and the index finger of occupant 15 used to operate activation member 66 at the same time occupant 15 is operating personal mobility device 20. In alternative embodiments, user input device 60 may not include direction control member 64 and activation member 66, but rather may include a keyboard, a joystick, or other device for controlling the operation of computer 40.

Figure 6:
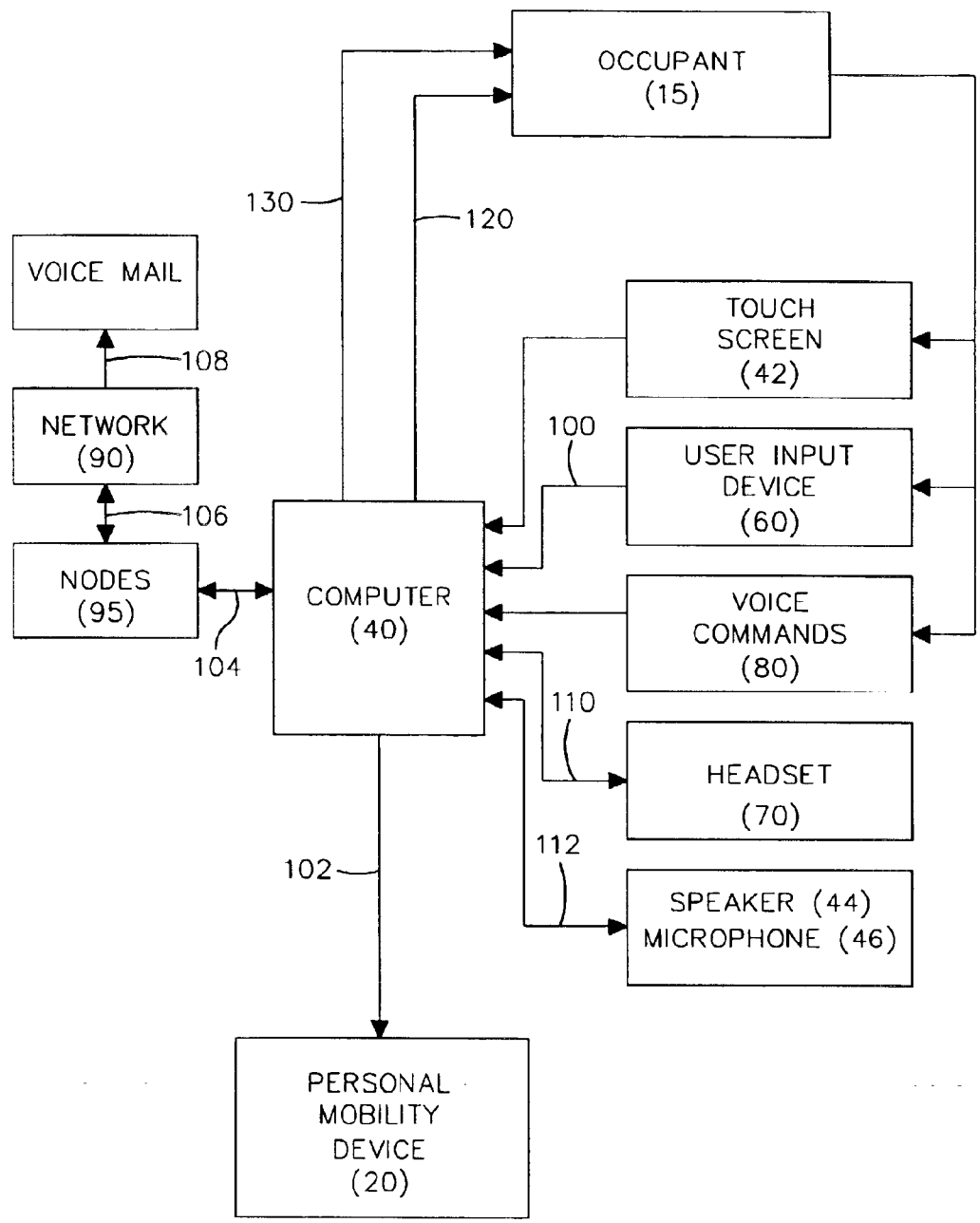
FIG. 6 is a block diagram of the systems employed in a computer-equipped mobility device according to a preferred embodiment of the present invention.

Referring now to FIG. 6, user input device 60 is linked to computer 40 through link 100. Link 100 may be accomplished through the use of wires connecting user input device 60 to computer 40, or through the use of wireless communication. Various wireless communication technologies may be used including, but not limited to, those that make use of infrared light and/or radio frequencies, such as that used by Bluetooth compatible devices.

As an alternative and/or additional way to at least partially control the operation of computer 40, a touch screen 42 (FIG. 3) may be provided on computer 40. Touch screen 42 allows occupant 15 to dictate the operation of computer 40 by selectively applying pressure to particular portions of the display screen provided on computer 40. In alternative embodiments, computer 40 (as well as user input device 60 and touch screen 42 through computer 40) may be linked to personal mobility device 20 through link 102 and used to at least partially control and/or monitor the operation of personal mobility device 20.

In a preferred embodiment, computer 40 is linked to a network 90. To provide computer 40 with access to network 90, signal transmitting and receiving nodes 95 may be intermittently dispersed within an area in which wireless communication capabilities are desired. Nodes 95 are linked to network 90 through link 106 and are arranged such that when computer-equipped mobility device 10 enters the area in which nodes 95 have been dispersed, computer 40 is able to wirelessly communicate with nodes 95 through a wireless link 104. Wireless link 104 may be accomplished through the use of existing wireless communication technologies, including those that use infrared light and/or radio frequencies. As a result of link 104, computer 40 is provided with access to network 90 as it travels through the area in which nodes 95 have been placed. More specifically, as computer-equipped mobility device 10 enters the wireless communication area, it enters into the communication range of a particular node 95. As computer-equipped mobility device 10 moves through the area, it eventually travels beyond the range of that particular node 95. However, prior to leaving the range of one node 95, it enters the range of another node 95, which ensures that computer-equipped mobility device 10 will never be out of range of a node 95 when it is in the wireless communication area. This process is continually repeated as computer-equipped mobility device 10 moves through the wireless communication area. The arrangement of nodes 95 (such as where they are placed and the distance between each of the nodes) may vary depending on the type of wireless technology utilized.

When computer-equipped mobility device 10 is within the network accessible area, computer 40 is linked to network 90 (through nodes 95) and provides occupant 15 with access to network 90. Once provided with access to network 90, occupant 15 is able to engage in two-way communication with network 90 (i.e. retrieve information from, and enter information into, the network) by providing commands to computer 40 (either through the use of touch screen 42 and/or user input device 60). In a medical context, network 90 may be a hospital information system that includes various patient information and administrative information. For example, the hospital information system may allow doctors to access patient charts, to check data generated by patient monitors, to adjust equipment settings, or to perform a multitude of other tasks. The system may also generate alerts and warnings that notify a doctor when specific events occur to patients or when other events of interest occur. Essentially, computer 40 may be linked to a variety of different networks and may provide occupant 15 with a full range of communication options when computer-equipped mobility device 10 is within the network accessible area.

Figure 5:
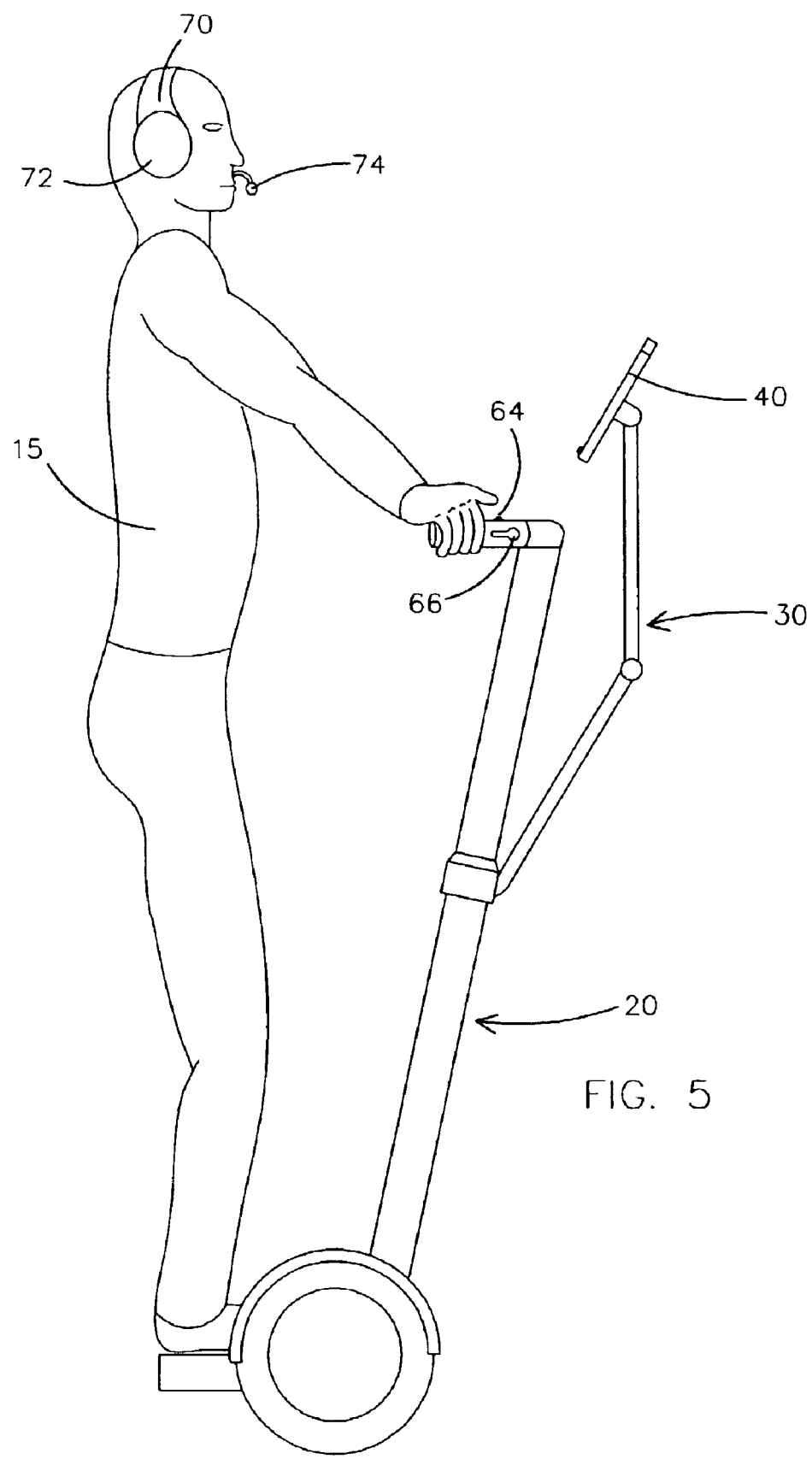
FIG. 5 is a side elevational view of a computer-equipped mobility device according to yet another embodiment of the present invention shown with an occupant.

Referring now to FIGS. 4–6, occupant 15 may also be able to utilize existing technologies, such as Voice Over IP (VOIP), to receive phone calls while computer 40 is linked to network 90. At step 200, the computer establishes a link with network 90. Then at step 210, computer 40 receives an incoming call through network 90 while occupant 15 is operating computer-equipped mobility device 10. At step 220, computer 40 detects the call and generates an incoming call indication signal 130 that indicates to occupant 15 that there is an incoming call. Incoming call indication signal 130 may be one or both of a message displayed on the computer screen (which may be touch screen 42) or a sound generated by computer 40 that is associated with an incoming call. Computer 40 then awaits a signal from occupant 15. At step 230, occupant 15 may provide a signal indicating that occupant 15 would like to answer the phone call by touching touch screen 42 in the appropriate location or by activating user input device 60. In a preferred embodiment, user input device 60 includes activation member 66, which allows occupant 15 to signal computer 40 simply by activating activation member 66. With activation member 66 positioned proximate where the hands of occupant 15 normally would rest while occupant 15 operates computer-equipped mobility device 10, occupant 15 may easily signal computer 40 to answer the incoming call without substantially sacrificing the ability to operate computer-equipped mobility device 10.

At step 240, occupant 15 simply does not activate user input device 60 if occupant 15 does not wish to answer the incoming call. If computer 40 does not receive a signal to answer the incoming call after a set period of time, computer 40 may be programmed to direct the call to the voice mail of occupant 15, which is linked to network 90 through link 108. The period of time after which computer 40 will direct the call to voice mail may be set by occupant 15. For example, occupant 15 may program computer 40 to transfer a call to voice mail after four rings, after 20 seconds, immediately if occupant 15 is presently participating in a call, or after a variety of other programmable time intervals. Occupant 15 may also program computer 40 not to direct a call to the voice mail of occupant 15, but rather to continue to generate incoming call indication signal 130 as long as the caller remains on the line.

Computer-equipped mobility device 10 may optionally include a headset 70 that includes a speaker 72 and a microphone 74. Headset 70 is linked to computer 40 through link 110 and allows occupant 15 to engage in two-way communication with computer 40. Link 110 may be accomplished through the use of a cord or through wireless communication. The wireless communication may utilize existing infrared light and/or radio frequency technologies, or other adequate wireless communication technologies. In a preferred embodiment, link 110 is inactive until the need arises for communication between headset 70 and computer 40. For example, the link between computer 40 and headset 70 is inactive prior to and at the time computer 40 detects an incoming call and generates incoming call indication signal 130. However, when occupant 15 signals to computer 40 that occupant 15 desires to answer the call by activating user input device 60 (or by touching touch screen 42 in the appropriate location), this indicates to computer 40 that there is a need to activate link 110. Thus, at step 250, computer 40 receives the signal that occupant 15 wishes to answer the call and detects whether headset 70 is present.

If headset 70 is present, step 260a consists of computer 40 activating link 110. Once link 110 is activated, step 270 consists of computer 40 providing a medium for two-way communication between the caller and occupant 15. If computer 40 does not detect the presence of headset 70, step 260b consists of computer 40 activating a link 112 with a speaker 44 and a microphone 46 (also shown in FIG. 1) that may be coupled to, or included within, computer 40. Once link 112 is activated, step 270 consists of computer 40 providing a medium for two-way communication between the caller and occupant 15.

When occupant 15 is ready to end a call, occupant 15 simply activates user input device 60 a second time. At step 280, computer 40 then terminates the call. During the last step 290, computer 40 deactivates link 110 (if occupant 15 is using headset 70) or link 112 (if occupant is not using headset 70). With user input device 60 positioned proximate the location where the hands of occupant 15 normally would rest while operating computer-equipped mobility device 10, occupant 15 may easily answer and terminate a call without substantially sacrificing the ability to operate computer-equipped mobility device 10.

In addition to (or as an alternative to) controlling the operation of computer 40 through the use of touch screen 42 and/or user input device 60, occupant 15 may also control computer 40 through the use of voice commands 80. Computer 40 may include voice recognition software that allows occupant 15 to control computer 40 by saying words associated with specific computer commands. For example, when computer 40 is generating an incoming call indication signal 130, occupant 15 may say "answer," which will cause computer 40 to answer the call. Similarly, occupant 15 may say "terminate" at the end of the call, which computer 40 will recognize as the command to terminate the call. Computer 40 may be programmed to recognize a plurality of voice commands 80 that cause computer 40 to take one of a multitude of possible actions. In alternative embodiments, computer 40 may be linked to personal mobility device 20 through link 102 such that occupant 15 may at least partially control the operation of personal mobility device 20 by speaking voice commands 80.

While the embodiments and application of the invention illustrated in the figures and described above are preferred, it should be understood that these embodiments are offered by way of example only. Accordingly, the present invention is not limited to a particular embodiment, but extends to various modifications that nevertheless fall within the scope of the appended claims.

What is claimed is:

1. A computer-equipped mobility device for transporting an occupant of the device over a distance and for providing access to a network, the computer-equipped mobility device comprising a personal mobility device;

a computer coupled to the personal mobility device, the computer configured to link to the network and to engage in two-way communication with the network, wherein the computer comprises a speaker and a microphone; and an activation member coupled to the personal mobility device and linked to the computer, the activation member capable of at least partially controlling the operation of the computer, wherein the computer answers the call when the activation member is activated a first time, and wherein the computer terminates the call when the activation member is activated a second time, and wherein the computer is configured to receive calls when the computer is linked to the network, and further wherein the computer activates the speaker and microphone after the first time the activation member is activated if the computer does not detect the presence of a headset.

2. The computer-equipped mobility device of claim 1, wherein the personal mobility device accommodates only one occupant.

3. The computer-equipped mobility device of claim 1, wherein the activation member is useable by the occupant to at least partially operate the computer while the occupant is operating the personal mobility device.

4. The computer-equipped mobility device of claim 1, wherein the activation member is linked to the computer through wireless communication.

5. The computer-equipped mobility device of claim 1, wherein the activation member is configured and located such that the activation member is controllable by one of the fingers of the occupant while the occupant is operating the personal mobility device.

6. The computer-equipped mobility device of claim 1, wherein the activation member is capable of at least partially controlling the operation of the personal mobility device.

7. The computer-equipped mobility device of claim 1, wherein the computer indicates the presence of an incoming call by at least one of a visual display and an audible alert.

8. The computer-equipped mobility device of claim 1, wherein the computer comprises a touch screen.

9. The computer-equipped mobility device of claim 8, wherein the computer answers the call when the touch screen is touched a first time, and wherein the computer terminates the call when the touch screen is touched a second time.

10. The computer-equipped mobility device of claim 1, wherein the occupant has voice mail, and wherein the computer transfers the call to the occupant's voice mail if the activation member is not activated a first time.

11. The computer-equipped mobility device of claim 10, wherein the computer can be programmed to transfer the call to the occupant's voicemail after the expiration of one of a plurality of time intervals.

12. The computer-equipped mobility device of claim 1, further comprising a headset linked to the computer, the headset capable of engaging in two-way communication with the computer.

13. The computer-equipped mobility device of claim 12, wherein the headset is linked to the computer through wireless communication.

14. The computer-equipped mobility device of claim 12, wherein the computer establishes a link to the headset after the occupant activates the activation member the first time.

15. The computer-equipped mobility device of claim 14, wherein the wireless link between the computer and the headset is terminated after the occupant activates the activation member the second time.

16. The computer-equipped mobility device of claim 1, wherein the computer is one of a tablet PC, a PDA, a laptop, and a pocket PC.

17. The computer-equipped mobility device of claim 1, wherein at least one of the computer and the activation member is detachably coupled to the personal mobility device.

18. The computer-equipped mobility device of claim 1, wherein the network is a hospital information system.

19. The computer-equipped mobility device of claim 18, wherein the computer is configured to provide patient information when the computer is linked to the hospital information system.

20. The computer-equipped mobility device of claim 19, wherein the patient information includes at least one of patient charts, patient status information, and patient monitoring information.

21. A computer-equipped mobility device for transporting an occupant of the device over a distance and for providing access to a network within a network accessible area, the computer-equipped mobility device comprising:

a personal mobility device configured to accommodate a single occupant;

a computer coupled to the personal mobility device, the computer configured to link to the network through wireless communication when the computer-equipped mobility device is within the network accessible area, wherein the computer comprises a speaker and a microphone; and an activation member coupled to the personal mobility device, the activation member being linked to the computer and allowing the occupant to at least partially control the operation of the computer while the occupant is operating the personal mobility device, wherein the computer activates the speaker and microphone after the activation member is activated if the computer does not detect the presence of a headset.

22. A method of receiving a phone call while operating a computer-equipped mobility device, the method comprising the steps of:

establishing a link between a computer included in the computer-equipped mobility device and a network;

receiving an incoming call while linked to the network;

indicating the presence of the incoming call to an occupant of the computer-equipped mobility device;

answering the call after the occupant of the computer-equipped mobility device activates for a first time an activation member that is linked to the computer;

establishing a link between the computer and at least one of a headset worn by the occupant of the computer-equipped mobility device and a speaker and microphone included in the computer after the activation member is activated for the first time, wherein the link is established to the speaker and microphone if the computer does not detect the presence of the headset;

providing a medium for two-way communication between the caller and the occupant;

terminating the call after the activation member is activated a second time;

terminating the link between the computer and the at least one of the headset worn by the occupant of the computer-equipped mobility device and the speaker and microphone included in the computer; and transferring the call to the occupant's voice mail after one of a plurality of time intervals elapses before the activation member is activated the first time.

23. A computer-equipped mobility device for transporting an occupant of the vehicle over a distance and for providing access to a hospital information system within a system accessible area, the computer-equipped mobility device comprising:

a personal mobility device configured to accommodate a single occupant, the personal mobility device comprising at least two wheels, a platform disposed between the at least two wheels, a column extending from the platform and having a first end coupled to the platform, and handlebars coupled to a second end of the column;

a first support member coupled to the personal mobility device; and a computer detachably coupled to the first support member, the computer configured to link to the hospital information system through wireless communication and to provide at least one of patient charts, patient status information, and patient monitoring information when the computer-equipped mobility device is within the system accessible area, wherein the computer is one of a tablet PC, a PDA, a laptop, and a pocket PC;

a second support member coupled to the personal mobility device; and an activation member coupled to the second support member, the activation member being linked to the computer and allowing the occupant to at least partially control the operation of the computer while the occupant is operating the personal mobility device.

24. A computer-equipped mobility device for connecting to a network, the computer-equipped mobility device comprising:

a means for transporting an occupant over a distance;

a means for linking to the network and for engaging in two-way communication with the network, wherein the linking means is operable while the occupant is operating the transporting means and wherein the linking means is configured to receive calls; and a means for answering and terminating calls received by the linking means, wherein the linking means includes at least one of a headset worn by the occupant and a speaker and microphone, and wherein when the answering means is activated, the linking means links the speaker and microphone to the network if the linking means does not detect the presence of the headset.

* * * * *